(12) United States Patent
Onodera et al.

(10) Patent No.: US 9,828,261 B2
(45) Date of Patent: Nov. 28, 2017

(54) LIQUID TREATMENT UNIT, TOILET SEAT WITH WASHER, WASHING MACHINE, AND LIQUID TREATMENT APPARATUS

(71) Applicant: Panasonic Intellectual Property Management Co., Ltd., Osaka (JP)

(72) Inventors: Mari Onodera, Osaka (JP); Masaki Fujikane, Osaka (JO); Shin-ichi Imai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/428,481

(22) Filed: Feb. 9, 2017

(65) Prior Publication Data

US 2017/0152164 A1 Jun. 1, 2017

Related U.S. Application Data

(63) Continuation of application No. 14/530,875, filed on Nov. 3, 2014, now abandoned.

(30) Foreign Application Priority Data

Nov. 18, 2013 (JP) ................................ 2013-238036

(51) Int. Cl.
*C02F 1/46* (2006.01)
*C02F 1/467* (2006.01)
*A47K 13/30* (2006.01)

(52) U.S. Cl.
CPC .......... *C02F 1/4608* (2013.01); *A47K 13/302* (2013.01); *C02F 2303/04* (2013.01); *C02F 2305/023* (2013.01); *C02F 2307/12* (2013.01)

(58) Field of Classification Search
CPC .... C02F 1/4608; C02F 1/46114; C02F 1/467; C02F 2201/4619; C02F 2303/04;
(Continued)

(56) References Cited

U.S. PATENT DOCUMENTS 5,429,723 A 7/1995 Atkinson
5,464,513 A 11/1995 Goriachev et al.
(Continued)

FOREIGN PATENT DOCUMENTS

CN 101798132 A 8/2010
CN 201952263 U 8/2011
(Continued)

OTHER PUBLICATIONS

English Translation of Chinese Search Report dated Mar. 7, 2016 for the related Chinese Patent Application No. 201410612565.5.
(Continued)

*Primary Examiner* — Ana Fortuna
(74) *Attorney, Agent, or Firm* — McDermott Will & Emery LLP

(57) ABSTRACT

A liquid treatment unit includes: a treatment tank provided with an inlet and an outlet, the treatment tank having a shape that allows a portion of liquid to be retained; a controller that controls supply of liquid into the treatment tank and ejection of liquid from the treatment tank; and a plasma generator generates plasma in the liquid inside the treatment tank. The plasma generator generates plasma while the controller stops supply of liquid and ejection of liquid. After the liquid has been treated, the controller resumes the supply of liquid, and causes the liquid to be ejected from the treatment tank while allowing a portion of the treated liquid to be retained inside the treatment tank.

10 Claims, 8 Drawing Sheets

(58) Field of Classification Search
CPC .............. C02F 1/04; C02F 2201/46175; C02F 2201/48; B01J 19/088
See application file for complete search history.

(56) References Cited

U.S. PATENT DOCUMENTS

| | | | |
|---|---|---|---|
| 5,630,915 | A | 5/1997 | Greene et al. |
| 5,766,447 | A | 6/1998 | Creijghton |
| 6,174,500 | B1 | 1/2001 | Uno et al. |
| 6,331,321 | B1 | 12/2001 | Robbins |
| 6,630,915 | B1 * | 10/2003 | Flood .................... G02B 27/017 345/8 |
| 2002/0008014 | A1 | 1/2002 | Adachi et al. |
| 2002/0014400 | A1 | 2/2002 | Zadiraka et al. |
| 2002/0157966 | A1 | 10/2002 | Weakly et al. |
| 2004/0217068 | A1 | 11/2004 | Kirby |
| 2004/0238343 | A1 | 12/2004 | Kuo et al. |
| 2005/0103722 | A1 | 5/2005 | Freydina et al. |
| 2005/0189278 | A1 | 9/2005 | Iijima et al. |
| 2010/0126940 | A1 | 5/2010 | Ryu et al. |
| 2010/0219136 | A1 | 9/2010 | Campbell et al. |
| 2010/0239473 | A1 | 9/2010 | Iijima et al. |
| 2010/0307372 | A1 | 12/2010 | Remick et al. |
| 2013/0334955 | A1 | 12/2013 | Saitoh et al. |
| 2014/0014516 | A1 | 1/2014 | Kumagai et al. |
| 2014/0054242 | A1 | 2/2014 | Imai |
| 2014/0231329 | A1 | 8/2014 | Imai et al. |
| 2014/0326681 | A1 | 11/2014 | Denvir et al. |
| 2014/0353223 | A1 | 12/2014 | Nishimura et al. |
| 2015/0102255 | A1 | 4/2015 | Imai et al. |
| 2015/0136672 | A1 | 5/2015 | Onodera et al. |
| 2015/0136711 | A1 | 5/2015 | Fujikane et al. |
| 2015/0191371 | A1 | 7/2015 | Fujikane et al. |
| 2015/0225264 | A1 | 8/2015 | Fujikane et al. |
| 2015/0251933 | A1 | 9/2015 | Nakamura et al. |
| 2015/0307370 | A1 | 10/2015 | Kang |
| 2015/0352516 | A1 | 12/2015 | Imada et al. |

FOREIGN PATENT DOCUMENTS

| | | |
|---|---|---|
| EP | 2072471 A1 | 6/2009 |
| JP | 61-025698 A | 2/1986 |
| JP | 9-507428 A | 7/1997 |
| JP | 2000-093967 A | 4/2000 |
| JP | 2000-237755 A | 9/2000 |
| JP | 2002-159973 A | 6/2002 |
| JP | 2003-059914 A | 2/2003 |
| JP | 2004-143519 A | 5/2004 |
| JP | 2005-058887 A | 3/2005 |
| JP | 2005-296909 A | 10/2005 |
| JP | 2007-207540 A | 8/2007 |
| JP | 2009-183867 A | 8/2009 |
| JP | 2009-255027 A | 11/2009 |
| JP | 2010-523326 A | 7/2010 |
| JP | 4784624 B2 | 10/2011 |
| JP | 2012-011301 A | 1/2012 |
| JP | 2012011313 A | 1/2012 |
| JP | 2012-075981 A | 4/2012 |
| JP | 2012164556 A | 8/2012 |
| JP | 2012204249 A | 10/2012 |
| JP | 2012217917 A | 11/2012 |
| JP | 2013150975 A | 8/2013 |
| WO | 2012157248 A1 | 11/2012 |

OTHER PUBLICATIONS

Co-pending U.S. Appl. No. 14/530,741, filed Nov. 1, 2014 (entire patent file history).
Co-pending U.S. Appl. No. 14/530,791, filed Nov. 2, 2014 (entire patent file history).
Co-pending U.S. Appl. No. 14/530,878, filed Nov. 3, 2014 (entire patent file history).
Co-pending U.S. Appl. No. 14/693,896, filed Apr. 23, 2015 (entire patent file history).

* cited by examiner

LIQUID TREATMENT UNIT, TOILET SEAT WITH WASHER, WASHING MACHINE, AND LIQUID TREATMENT APPARATUS

CROSS REFERENCE TO RELATED APPLICATIONS

This Application is a continuation of U.S. patent application Ser. No. 14/530,875 filed Nov. 3, 2014, which in turn claims the benefit and priority from Japanese Patent Application No. 2013-238036, filed on Nov. 18, 2013, the contents of which are hereby incorporated by reference.

BACKGROUND

1. Technical Field

The present disclosure relates to a liquid treatment unit, a toilet seat with a washer, a washing machine, and a liquid treatment apparatus.

2. Description of the Related Art

Sterilizing apparatuses that use plasma to treat liquids such as polluted water have been proposed. For example, in the sterilizing apparatus disclosed in the specification of Japanese Patent No. 4784624, a high-voltage electrode and a grounding electrode are arranged with an interval therebetween in liquid inside a treatment tank. In a sterilization treatment apparatus configured in this manner, when a high-voltage pulse is applied between both electrodes to cause electrical discharge, plasma is generated in gas bubbles produced by the instantaneous boiling phenomenon, producing radicals such as OH, H, O, $O_2^-$, and $O^-$ and also $H_2O_2$, which destroys microorganisms and bacteria.

SUMMARY

In apparatuses having a conventional configuration, there has been a problem concerning liquid treatment efficiency.

The present disclosure provides a liquid treatment unit, a toilet seat with a washer, a washing machine, and a liquid treatment apparatus, with which liquids are treated in an efficient manner.

A liquid treatment unit according to an aspect of the present disclosure includes: a treatment tank provided with an inlet and an outlet, the treatment tank having a shape that allows a portion of liquid to be retained; a controller that controls supply of liquid into the treatment tank and ejection of liquid from the treatment tank; and a plasma generator generates plasma in the liquid inside the treatment tank. The plasma generator generates plasma to cause the liquid to be treated while the controller stops supply of liquid and ejection of liquid in a state where the liquid is present inside the treatment tank. After the liquid has been treated, the controller resumes the supply of liquid into the treatment tank and causes the liquid to be ejected from the treatment tank while allowing a portion of the treated liquid to be retained inside the treatment tank.

The liquid treatment unit, the toilet seat with a washer, the washing machine, and the liquid treatment apparatus according to the present disclosure are able to treat liquid in an efficient manner.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

Figure 1:
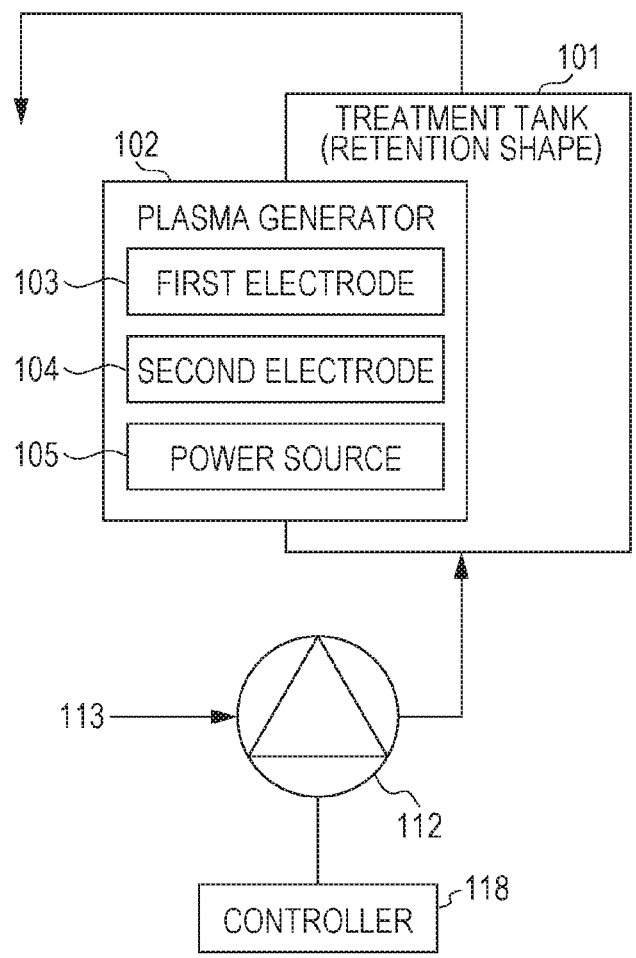
FIG. 1 is a schematic diagram depicting an example of the overall configuration of a liquid treatment unit according to embodiment 1 of the present disclosure.

DETAILED DESCRIPTION OF THE EMBODIMENTS (Underlying Knowledge Forming Basis of the Present Disclosure)

As described above, the sterilizing apparatus in the specification of Japanese Patent No. 4784624 is configured with a high-voltage electrode and a grounding electrode arranged in liquid inside a treatment tank. In a sterilizing apparatus configured in this manner, when electrical discharge is caused between the high-voltage electrode and the grounding electrode, liquid is vaporized by the instantaneous boiling phenomenon, and plasma is generated therein. Then, in the sterilizing apparatus, radicals produced by the plasma can collide with bacteria in the liquid, and liquid treatment is thereby performed.

However, in conventional sterilizing apparatuses, it has been difficult to cause radicals to collide with bacteria floating in liquid. For example, in the case where the sterilizing apparatus continuously treats liquid in a treatment tank while supplying liquid thereinto and ejecting liquid therefrom, liquid is passed therethrough tank only once. In such a case, there has been a problem in that it is difficult to increase sterilization efficiency. In other words, in conventional apparatuses, it is difficult to cause the radicals in the liquid to collide efficiently with the bacteria moving in the liquid, preventing liquid from being treated in a short time.

Therefore, the inventors took these kinds of problems of the conventional technology into consideration, and thus conceived of a novel liquid treatment apparatus. A liquid treatment apparatus constituting an aspect of the present disclosure is as follows.

A liquid treatment unit according to an aspect of the present disclosure includes: a treatment tank provided with an inlet and an outlet, the treatment tank having a shape that allows a portion of liquid to be retained; a controller that controls supply of liquid into the treatment tank and ejection of liquid from the treatment tank; and a plasma generator that generates plasma in the liquid inside the treatment tank. The plasma generator generates plasma to cause the liquid to be treated while the controller stops supply of liquid and ejection of liquid in a state where the liquid is present inside the treatment tank. After the liquid has been treated, the controller resumes the supply of liquid into the treatment tank and causes the liquid to be ejected from the treatment tank while allowing a portion of the treated liquid to be retained inside the treatment tank.

According to the liquid treatment unit according to an aspect of the present disclosure, while the supply of liquid and the ejection of liquid are performed, a portion of the liquid which has treated by plasma is retained inside the treatment tank due to the shape thereof, and therefore comes into contact with the newly supplied liquid in a mixed state. Radicals produced by the plasma remain in the liquid being retained. In other words, the newly supplied liquid come into contact with the radicals in the retained liquid while passing through the treatment tank, and it is thereby possible to continuously obtain liquid that has a sterilization effect. For example, when liquid including germs and/or organic matters is supplied into the treatment tank, the germs in the liquid are killed and/or the organic matters in the liquid is decomposed by the radicals remaining in the treatment tank.

In the liquid treatment unit according to an aspect of the present disclosure, for example, prior to stopping the supply of liquid and the ejection of liquid, the controller may cause the liquid to be supplied into the treatment tank prior to stopping the supply of liquid and the ejection of liquid.

As a result of the step in which the liquid is supplied into the treatment tank, a state is reached where the liquid is present inside the treatment tank.

In the liquid treatment unit according to an aspect of the present disclosure, for example, when the liquid is ejected while allowing a portion of the treated liquid to be retained inside the treatment tank, the plasma generator may further generate the plasma in the liquid inside the treatment tank.

In addition to the step in which the supply of liquid and the ejection of liquid are stopped, plasma is generated in the liquid inside the treatment tank also in the step in which the supply of liquid and the ejection of liquid are performed. Thus, after the supply of liquid is resumed, newly supplied liquid also comes into contact with radicals produced by the newly generated plasma. Thus, the sterilization effect improves.

In the liquid treatment unit according to an aspect of the present disclosure, for example, when the liquid is ejected while allowing a portion of the treated liquid to be retained inside the treatment tank, the quantity of the liquid ejected from the treatment tank may be equal to or greater than the volume of the treatment tank.

Since a portion of the radicals remains in the treatment tank, newly supplied liquid can come into contact with the radicals that have already been produced in the treatment tank.

In the liquid treatment unit according to an aspect of the present disclosure, for example, a cross section of the outlet may be smaller than the cross section of the internal space of the treatment tank.

This allows a portion of the liquid to be retained inside the treatment tank while liquid passing therethrough. Thus, newly supplied liquid can be brought into contact with liquid that has already been treated.

In the liquid treatment unit according to an aspect of the present disclosure, for example, the plasma generator may generate a gas bubble, a cross section of the gas bubble being smaller than the cross section of the internal space of the treatment tank.

This can inhibit liquid in the treatment tank from being involved with the flow of gas bubble and ejected with the gas bubble. In other words, while the liquid is ejected, a portion of the liquid can be retained inside the treatment tank. As a result of the shape, newly supplied liquid can be brought into contact with liquid that has already been treated.

The liquid treatment unit according to an aspect of the present disclosure, for example, may further include a circulation flow passage extending from the outlet to the inlet, and a distributor. The distributor causes a portion of the liquid ejected from the treatment tank to be recirculated to the treatment tank through the circulation flow passage.

The distributor recirculates a portion of the liquid, which has ejected from the treatment tank, to the treatment tank. Since radicals are present in the recirculated liquid, newly supplied liquid can be treated by the radicals in the recirculated liquid.

The liquid treatment unit according to an aspect of the present disclosure, for example, may further include a gas-liquid separator provided in a flow passage upstream or downstream from the treatment tank, the gas-liquid separator extracting gas from a mixture of the liquid and gas and emitting the gas to outside.

With a gas-liquid separator, the flow rate of the liquid supplied into the treatment tank and/or the flow rate of the liquid ejected from the treatment tank can be substantially increased.

In the liquid treatment unit according to an aspect of the present disclosure, for example, the plasma generator may be provided with: a first electrode at least a portion of which is arranged inside the treatment tank; a second electrode at least a portion of which is arranged inside the treatment tank; an insulator surrounding the periphery of the first electrode with a space therebetween, the insulator having an opening through which the space communicates the inside of the treatment tank; a power source that applies a voltage between the first electrode and the second electrode; and a gas supply device that supplies gas to the space. For example, at least part of the first electrode may include a region where a conductor surface thereof is exposed, and when the region is covered by the gas, the power source may apply the voltage.

Thus, the plasma generator can produce radicals having a long residence time. This enables newly supplied liquid to be brought into contact with liquid that has already been treated. For example, when the newly supplied liquid includes bacteria and/or organic matters, residual radicals can collide with the bacteria and/or organic matters in the liquid in an efficient manner.

In the liquid treatment unit according to an aspect of the present disclosure, for example, the plasma generator may be provided with: a first electrode at least a portion of which is arranged inside the treatment tank; a second electrode at least a portion of which is arranged inside the treatment tank;

an insulator surrounding the periphery of the first electrode with a space therebetween, the insulator having an opening through which the space communicates the inside of the treatment tank; and a power source that applies a voltage between the first electrode and the second electrode. For example, at least part of the first electrode may include a region where a conductor surface thereof is exposed, and the power source may apply the voltage, vaporizing liquid inside the space to produce gas, and causing discharge when the region is covered by the gas.

Thus, the plasma generator can produce radicals having a long residence time. This enables newly supplied liquid to be brought into contact with liquid that has already been treated. For example, when the newly supplied liquid includes bacteria and/or organic matters, residual radicals can collide with the bacteria and/or organic matters in the liquid in an efficient manner.

A toilet seat with a washer according to an aspect of the present disclosure, for example, includes the aforementioned liquid treatment unit, and a washing nozzle to which the liquid ejected from the treatment tank is supplied.

The toilet seat with a washer according to an aspect of the present disclosure, for example, may further include an input part that receives an instruction of washing from a user. The controller may stop the supply of liquid and the ejection of liquid prior to receiving the instruction from the input part, the plasma generator may generate plasma in the liquid inside the treatment tank while the supply of liquid and the ejection of liquid are stopped, and the controller, based on the instruction from the input part, may cause the liquid to be ejected to the washing nozzle while allowing a portion of the treated liquid to be retained inside the treatment tank.

A washing machine according to an aspect of the present disclosure, for example, may be provided with the aforementioned liquid treatment unit, and a washing tub to which the liquid ejected from the treatment tank may be supplied.

The washing machine according to an aspect of the present disclosure, for example, may further include an input part that receives an instruction of starting washing from a user. The controller may stop the supply of liquid and the ejection of liquid on the basis of input from the input part, the plasma generator may generate plasma in the liquid inside the treatment tank while the supply of liquid and the ejection of liquid are stopped, and the controller, after the liquid has been treated, may cause the liquid to be ejected to the washing tub while allowing a portion of the treated liquid to be retained inside the treatment tank.

A liquid treatment apparatus according to an aspect of the present disclosure, for example, is a liquid treatment apparatus that includes the aforementioned liquid treatment unit, and a water inlet to which the liquid ejected from the treatment tank is supplied. The liquid treatment apparatus is the one selected from the group consisting of a water purifying apparatus, an air conditioner, a humidifier, an electric shaver washer, a dish washer, a processing apparatus for hydroponic culture, and an apparatus for circulating nourishing solution.

A liquid treatment unit according to an aspect of the present disclosure, for example, may be provided with: a treatment tank provided with an inlet and an outlet, the treatment tank having a shape that allows a portion of liquid to be retained; a plasma generator that generates plasma in the liquid in a state where the liquid is present inside the treatment tank; a circulation flow passage extending from the outlet to the inlet; and a distributor that causes a portion of the liquid ejected from the treatment tank to be recirculated to the treatment tank through the circulation flow passage.

Hereafter, embodiments of the present disclosure are described with reference to the drawings. Note that in all of the following drawings, the same reference numbers have been appended to the same or corresponding portions, and there are cases where redundant descriptions have been omitted.

Note that the embodiments described hereafter all represent comprehensive or specific examples. The numerical values, the shapes, the materials, the components, the arrangement of the components, the mode of connection, the steps, and the order of the steps and so forth given in the following embodiments are examples and are not intended to limit the present disclosure. A plurality of steps may be executed separately in time or may be executed at the same time. Other steps may be inserted between the steps. Components that are not described in the independent claims are described as optional components.

Embodiment 1

<Liquid Treatment Unit>

Figure 2:
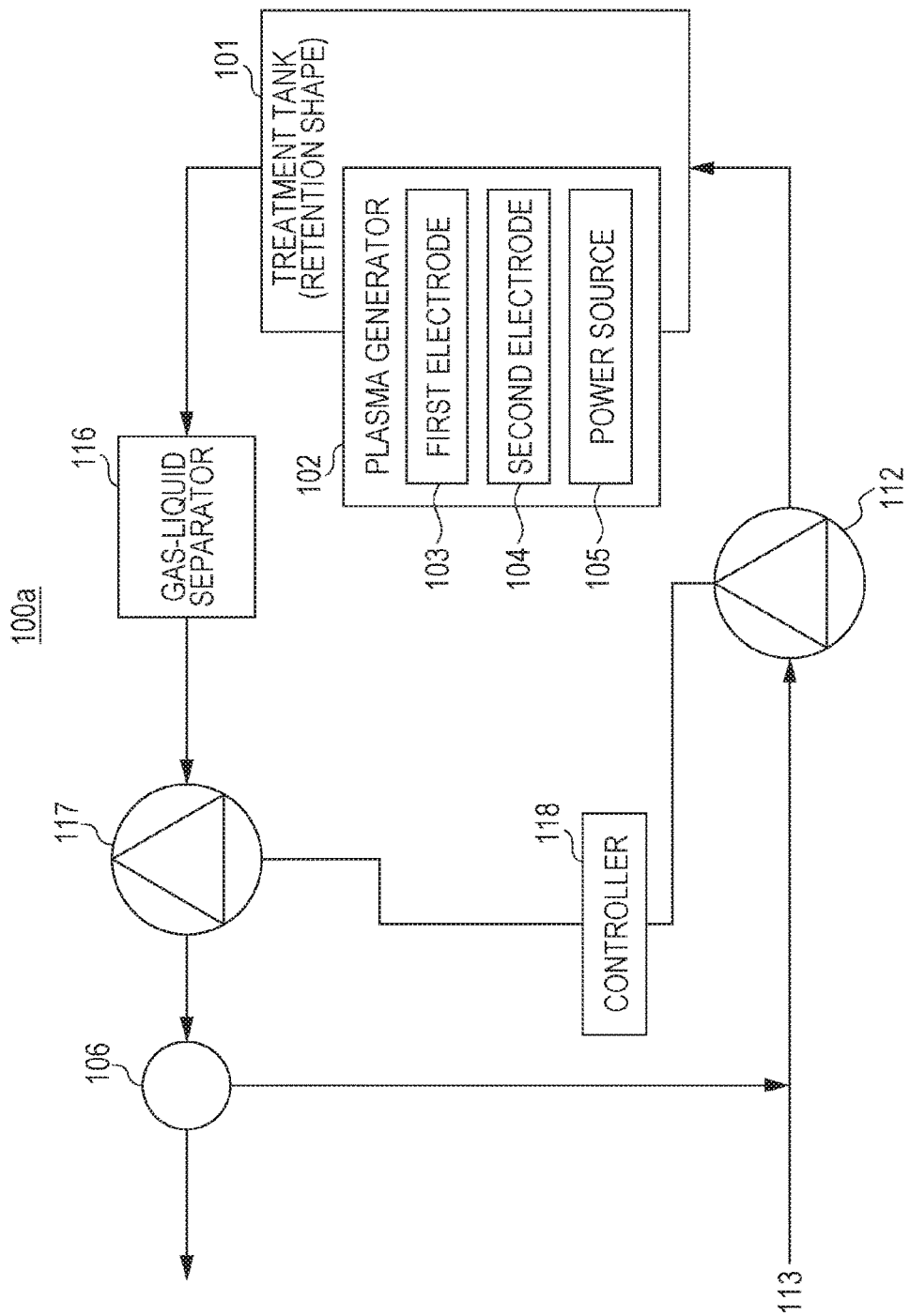
FIG. 2 is a schematic diagram depicting an example of the overall configuration of a modified example of the liquid treatment unit according to embodiment 1 of the present disclosure.

FIG. 1 is a block diagram depicting an example of the schematic configuration of a liquid treatment unit 100 according to embodiment 1. FIG. 2 is a schematic diagram depicting an example of the overall configuration of a liquid treatment unit 100*a* according to a modified example of embodiment 1 of the present disclosure.

The liquid treatment unit 100 according to embodiment 1 includes: a treatment tank 101 in which liquid is retained; an inlet 107 that supplies liquid to the treatment tank 101; an outlet 108 that ejects liquid from the treatment tank 101; a plasma generator 102; and a controller 118 that controls the flow rate of each of the liquid that is ejected from the treatment tank 101 and the liquid that is supplied into the treatment tank 101. The plasma generator 102 generates plasma in liquid of at least a partial region of the treatment tank 101. The plasma generator 102 includes a first electrode 103, a second electrode 104, and a power source 105. In this liquid treatment unit 100, the plasma generator 102 generates plasma in the liquid inside the treatment tank 101 while liquid is retained in the treatment tank 101, and thereby the retained liquid therein is treated by the radicals that are produced. When new liquid is supplied into the treatment tank 101 and a portion of the treated liquid is ejected from the treatment tank 101, treated liquid is partially retained due to the shape of the treatment tank 101. Therefore, the newly supplied liquid and the treated liquid can be mixed. This allows the newly supplied liquid to be treated effectively with radicals having a long residence time in the treated liquid.

Note that "controls the flow rate of each of the liquid that is ejected from the treatment tank and the liquid that is supplied into the treatment tank" includes being able to selectively switch between a mode in which liquid is ejected from the treatment tank and a mode in which liquid is not ejected from the treatment tank, and being able to selectively switch between a mode in which liquid is supplied into the treatment tank and a mode in which liquid is not supplied into the treatment tank. In other words, the controller can control whether or not liquid is ejected from the treatment tank, and whether or not liquid is supplied into the treatment tank.

The liquid treatment unit 100 may additionally include a gas-liquid separator 116 midway in a flow passage of the treatment tank 101, as depicted in FIG. 2. The liquid treatment unit 100 may include a distributor 106. The distributor 106 is provided midway from the treatment tank 101 to the outlet 108. The distributor 106 controls the distribution ratio, with which liquid flowing from the treatment tank 101 is distributed into liquid to be ejected to the outlet 108 and liquid to be recirculated to the treatment tank 101. In other words, the distributor 106 recirculates a portion of the treated liquid to the treatment tank 101. Since radicals having a long residence time are present in the recirculated liquid, the liquid treatment unit 100 is able to treat liquid newly supplied from the inlet 107, with these radicals.

When the liquid treatment unit 100 has the distributor 106, it may be further has a pump 117 midway to the distributor 106 from the treatment tank 101. The pump 117 causes liquid to be circulated in a fixed direction. The liquid treatment unit 100 may have a pump 112 in the vicinity of the inlet 107, to supply liquid 113 into the treatment tank 101. The liquid treatment unit 100 may have a controller 118 that controls the flow rate of the liquid inside the treatment tank 101.

Note that "controls the distribution ratio with which liquid flowing from the treatment tank is distributed into liquid to be ejected to the outlet and liquid to be recirculated to the treatment tank" includes selectively switching between a mode in which the liquid in the treatment tank is not ejected, and a mode in which a portion of the liquid is ejected at a preset distribution ratio from the liquid that flows into the distributor. In other words, the distributor can recirculate a portion of the liquid to the treatment tank and to eject the remaining liquid to the outlet.

Hereafter, examples of the components that make up the liquid treatment unit 100 are described.

<Treatment Tank>

Figure 3:
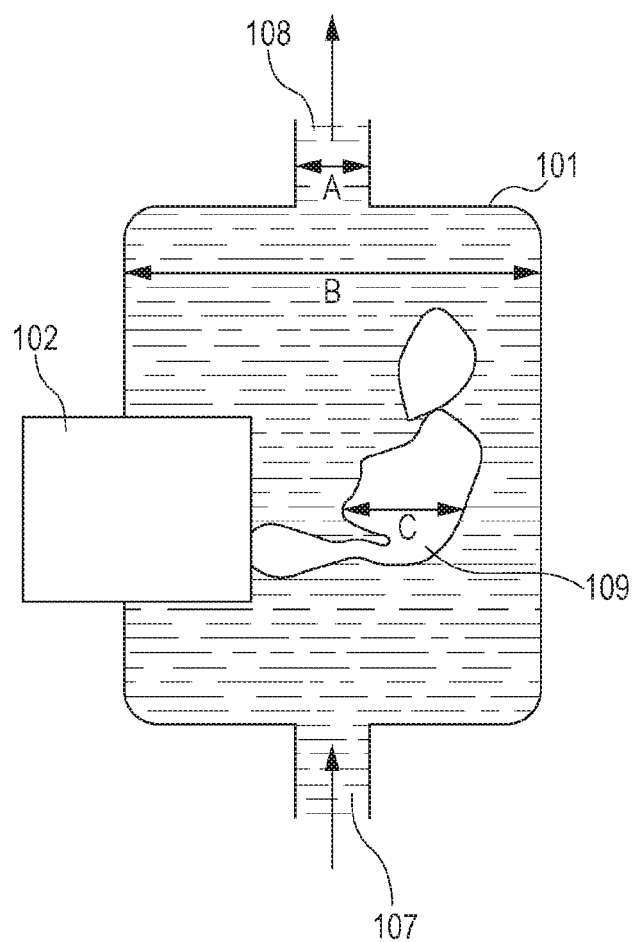
FIG. 3 is a cross sectional view depicting an example of the configuration of a treatment tank.

FIG. 3 is a cross sectional view depicting an example of the configuration of the treatment tank 101. The treatment tank 101 has a shape with which it is possible to retain liquid. The treatment tank 101 is provided with the inlet 107 that supplies the liquid into the treatment tank 101, and the outlet 108 that ejects the liquid from the treatment tank 101. In the example depicted in FIG. 3, the cross section (A in FIG. 3) of the outlet 108 provided in the treatment tank 101 is smaller than the cross section (B in FIG. 3) of the internal space of the treatment tank 101. With this shape, the treatment tank 101 depicted in FIG. 3 is able to cause a portion of the liquid to be retained inside the treatment tank 101 when the liquid is supplied and/or ejected. When the plasma generator 102 generates a gas bubble 109, the cross section (B in FIG. 3) of the internal space of the treatment tank 101 may be larger than the cross section (C in FIG. 3) of the gas bubble 109. Thus, it is possible to inhibit the liquid in the treatment tank from becoming involved with the flow of gas bubble and thereby being ejected from the treatment tank 101 with the gas bubble 109. In other words, a portion of the liquid can be retained inside the treatment tank 101 when the liquid is ejected.

When the liquid treatment unit 100 has the distributor 106, it may further include the pump 117 midway to the outlet 108 from the treatment tank 101. The pump 117 causes liquid to be circulated in a fixed direction. The method for circulating liquid is not restricted to the pump 117. The liquid treatment unit 100 may have the pump 112 in the vicinity of the inlet 107, the pump 112 supplying liquid 113 into the treatment tank 101. The treatment tank 101 may be a material that does not react with liquid. For the treatment tank 101 may be made of a material such as glass, plastic, silicone, or metal.

In the present disclosure, "the cross section of the internal space of the treatment tank" means the cross section perpendicular to the flow direction of the liquid that passes through the inside of the treatment tank. "A shape that allows a portion of the liquid to be retained inside the treatment tank" may be a shape in which the largest part of the cross section of the internal space of the treatment tank is larger than the cross section of the outlet, for example.

<Plasma Generator>

The plasma generator 102 generates plasma in liquid of at least a partial region of the treatment tank 101. Thus, radicals having a long residence time are produced in the liquid, and therefore the liquid retained in the treatment tank 101 is treated with radicals. There may be a plurality of the plasma generators 102, each of which is located in the treatment tank 101. The plasma generator 102 may be provided at the side near to the inlet 107 or at the side near to the outlet 108 in the treatment tank 101. The plasma generator 102, for example, may include: a first electrode 103 at least a portion of which is arranged inside the treatment tank 101; a second electrode 104 at least a portion of which is arranged inside the treatment tank 101; and a power source 105 that applies a voltage between the first electrode 103 and the second electrode 104.

<First Electrode>

At least a portion of the first electrode 103 may be arranged inside the treatment tank 101. The arrangement of the first electrode 103 is not particularly restricted as long as the first electrode 103 is arranged inside the treatment tank 101. The first electrode 103, for example, is formed from a material such as iron, tungsten, copper, aluminum, platinum, or an alloy including one or more metals selected from these metals. In order to prolong the electrode life span, yttrium oxide added with a conductive material may be thermally sprayed in a portion of the surface of the first electrode 103. Yttrium oxide added with a conductive material may have electric resistivity of 1 to 30 Ωcm, for example. The shape of the first electrode 103, for example, may be tubular, or cylindrical, with an opening at one end thereof that faces the treatment tank 101. However, the first electrode 103 is not limited to this shape.

<Second Electrode>

At least a portion of the second electrode 104 may be arranged inside the treatment tank 101. The arrangement of the second electrode 104 is not particularly restricted as long as the second electrode 104 is arranged inside the treatment tank 101. The second electrode 104 may be formed from a conductive metal material. As with the first electrode 103, the second electrode 104, for example, is formed from a material such as iron, tungsten, copper, aluminum, platinum, or an alloy including one or more metals selected from these metals.

<Power Source>

The power source 105 is arranged between the first electrode 103 and the second electrode 104. The power source 105 applies a high-frequency AC voltage between the first electrode 103 and the second electrode 104. The frequency of the AC voltage may be 1 kHz or greater, for example. The power source 105 may alternately apply a positive pulse voltage and a negative pulse voltage, namely a bipolar pulse voltage. By using a bipolar pulse voltage, it is possible to prolong the life spans of the electrodes.

<Gas-Liquid Separator>

The liquid treatment unit 100 may additionally include the gas-liquid separator 116 midway in a flow passage extending from the treatment tank 101 to the distributor 106, as depicted in FIG. 2. The gas-liquid separator 116 extracts gas from a mixture of liquid and gas in the flow passage and emits the gas to outside. Thus, it is possible to increase the actual flow rate of the liquid that is recirculated to the treatment tank 101.

<Controller>

Figure 4:
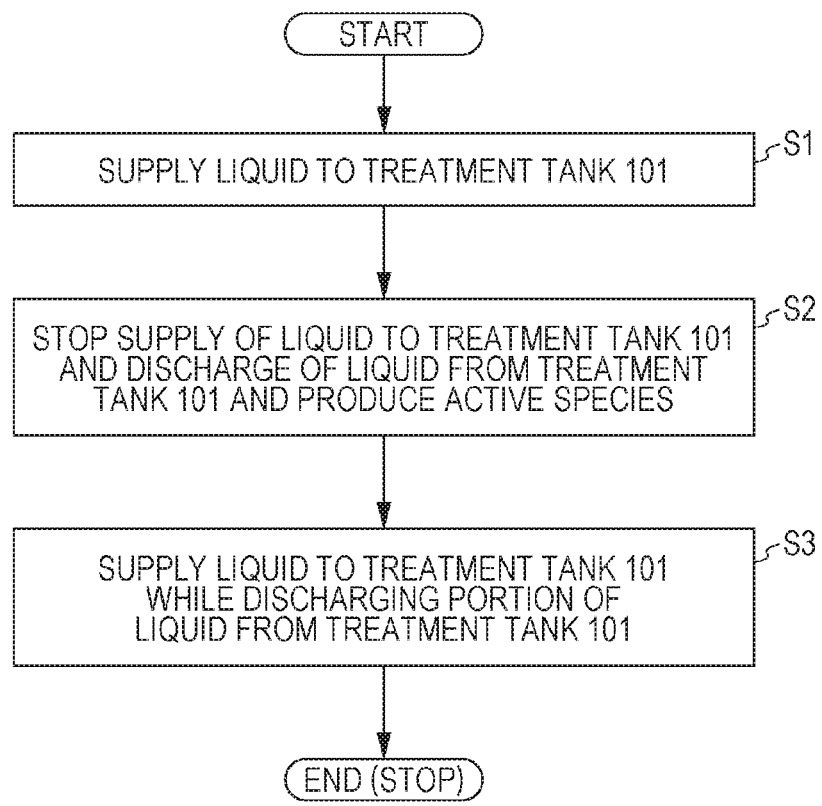
FIG. 4 is a flowchart depicting an example of steps executed by a controller.

The liquid treatment unit may have the controller 118, which controls the flow rate of each of the liquid ejected from the treatment tank 101 and the liquid supplied into the treatment tank 101. An example of a flowchart that includes steps executed by the controller 118 is depicted in FIG. 4. The first step (S1) to the third step (S3) described hereafter represent a series of liquid treatment steps.

In the first step (S1), liquid is supplied into the treatment tank 101 via the inlet 107. However, when liquid of a specific quantity or more is already present inside the treatment tank 101, the first step may be omitted.

After the first step, or in a state where liquid of a specific quantity or more is present inside the treatment tank 101, the second step (S2) is executed. In the second step (S2), the supply of liquid into the treatment tank 101 via the inlet 107 and the ejection of liquid from the treatment tank 101 via the outlet 108 are stopped. For example, the liquid supplied in the first step remains inside the treatment tank 101 for a predetermined time. The time of the second step may be appropriately set in accordance with the length of the residence time of the radicals, the volume of the treatment tank, the type and quantity of bacteria and/or organic compounds in the liquid, and the flow rate of the liquid supplied in the subsequent third step (S3), for example.

After the second step, in the third step (S3), a portion of the liquid retained inside the treatment tank 101 is ejected therefrom via the outlet 108, and newly liquid is supplied into the treatment tank 101 via the inlet 107. At such time, the timing at which the supply of liquid is started and the timing at which the ejection of liquid is started do not have to coincide completely. The flow rate of the liquid supplied or ejected and the period of the third step may be appropriately set in accordance with the length of the residence time of the radicals that are produced, the volume of the treatment tank, the type and quantity of bacteria and/or organic compounds in the liquid, for example.

In this case, in the second step, the plasma generator 102 generates plasma in the liquid inside the treatment tank 101, to produce radicals, thereby causing the liquid to be treated.

The second step and the subsequent third step may be executed once again after a predetermined quantity of liquid has been ejected in the third step. Alternatively, the second step and the third step may be repeatedly executed.

Note that in the present disclosure, when "the supply of liquid into the treatment tank is resumed", the liquid may be the same type of liquid as the liquid that has been supplied to the treatment tank prior thereto, or may be different liquid. For example, the liquid supplied into the treatment tank in the first step may be pure water or tap water, and the liquid supplied into the treatment tank in the third step may be polluted water that includes bacteria and/or organic matters.

The plasma generator 102 may generate plasma in the liquid inside the treatment tank 101 in the first step and/or the third step in addition to the second step. For example, as a result of plasma being generated in the third step in addition the second step, the liquid that is newly supplied in the third step is able to come into contact also with radicals that are newly produced by the plasma generated in the third step. Thus, the sterilization rate can improve.

In the third step, the controller may eject liquid of a volume equal to or greater than that of the treatment tank 101. When liquid of a volume equal to or greater than that of the treatment tank 101 is ejected, the ejected liquid inevitably includes the liquid that is newly supplied in the third step. When the residence time of the radicals produced by the plasma is long, the liquid that is newly supplied in the third step is able to come into contact with the radicals to a greater extent, thereby enabling liquid to be ejected in a sufficiently sterilized state.

The controller 118 may recirculate at least a portion of the liquid with the distributor 106, the portion of the liquid having supplied into the treatment tank 101 in the first step or the third step and ejected therefrom in the third step.

The controller 118 supplies liquid into the treatment tank 101 in the first step, and performs plasma treatment while the liquid is retained inside the treatment tank 101 in the second step. Germs present in the liquid inside the treatment tank 101 are killed and/or organic matters present in the liquid inside the treatment tank 101 is decomposed by active species including radicals produced by the plasma. In this case, a portion of the radicals remain in the liquid. When the supply of newly liquid and the ejection of the treated liquid are performed in the third step, a portion of the liquid that has been treated in the second step is retained inside the treatment tank 101 due to the shape of the treatment tank 101. In other words, a portion of the liquid that has been treated in the second step comes into contact with the newly supplied liquid, in a mixed state inside the treatment tank 101. As previously mentioned, radicals produced by the plasma remain in the retained liquid. As a result, the newly supplied liquid can come into contact with the radicals in the liquid retained inside the treatment tank 101, thus causing a sterilization effect.

The first step to the third step may be directly executed by the controller 118, or may be indirectly executed based on an instruction from the controller 118. For example, when liquid is to be supplied into the treatment tank 101 via the inlet 107, the controller 118 may operate the pump 112 provided at the inlet 107 to supply the liquid into the treatment tank 101. For example, the controller 118 may cause liquid to be ejected from the treatment tank 101 via the outlet 108, thereby causing liquid to be supplied in a quantity that is approximately the same as the quantity ejected into the treatment tank 101 via the inlet 107 because of changes in pressure inside the treatment tank 101. For example, the controller 118 may cause liquid to be supplied into the treatment tank 101 via the inlet 107, thereby causing liquid to be ejected in a quantity that is approximately the same as the quantity supplied from the treatment tank 101 via the outlet 108 because of changes in pressure inside the treatment tank 101.

<Distributor>

The liquid treatment unit 100 may include the distributor 106 outside of the treatment tank 101. The distributor 106 is provided in a circulation flow passage extending from the outlet 108 toward the inlet 107. The distributor 106 controls the distribution ratio, with which liquid has been ejected from the treatment tank 101 via the outlet 108 is distributed into liquid to be ejected via an ejection part of the liquid treatment unit 100 and liquid to be recirculated into the treatment tank 101. The distributor 106 is able to be realized by using a distribution valve, for example.

(Modified Example of a Plasma Generator)

Next, a modified example of a first electrode 103a and the configuration peripheral thereto, which are included in the plasma generator 102 of the liquid treatment unit 100 according to embodiment 1, is described.

Figure 5:
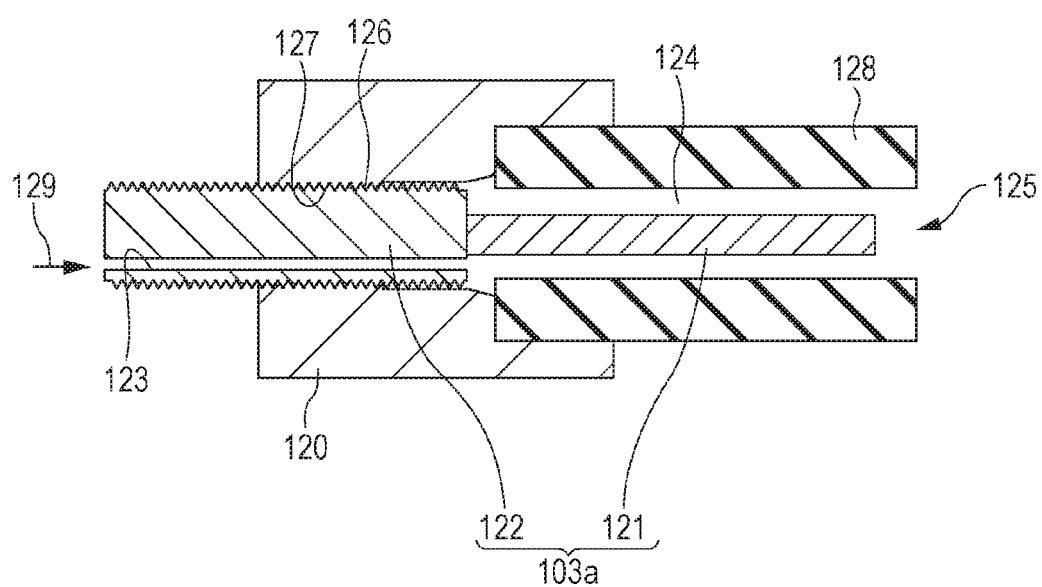
FIG. 5 is a schematic diagram depicting a modified example of a first electrode and the configuration peripheral thereto in a plasma generator in the liquid treatment unit according to embodiment 1 of the present disclosure.

FIG. 5 is a cross sectional view depicting a modified example of the first electrode 103a and the configuration peripheral thereto, that are included in the plasma generator 102. As depicted in FIG. 5, the first electrode 103a has an electrode portion 121 at one end side and a support portion 122 at the other end side. The electrode portion 121 is arranged inside the treatment tank 101. The support portion 122 is connected and fixed to a holding block 120, and is also connected to the power source 105. The support portion 122 may be a metal screw, for example. The electrode portion 121 is formed from a columnar conductor, for example. Columnar, for example, is a shape in which the diameter from one end to the other end of the electrode portion 121 does not change substantially. As result of employing this kind of shape, compared to a shape that becomes thinner toward the tip and has no substantial thickness at the endmost section such as a needle shape, it is possible to suppress an excessive concentration in the electric field toward the top end, and it is possible to suppress deterioration due to use. An insulator 128 is provided with a space 124 between the insulator 128 and the electrode portion 121. The insulator 128 has an opening 125 at one end side thereof, which is located inside the treatment tank 101. A through hole 123 is provided inside the support portion 122. A gas supply device (not depicted) is connected to the through hole 123. Gas 129 supplied from the gas supply device is supplied to the space 124 via the through hole 123. When the gas 129 is supplied to the space 124, a gas bubble 109 is generated in the liquid via the opening 125.

In the first electrode 103a, the electrode portion 121 and the support portion 122 may have different sizes, and may be formed from metal electrodes of different materials. As an example, the electrode portion 121 may have a diameter of 0.95 mm and tungsten may be used as the material therefor, and the support portion 122 may have a diameter of 3 mm and iron may be used as the material therefor. Here, the diameter of the electrode portion 121 may be 2 mm or less, for example, as long as it is a diameter at which plasma is generated. The material of the electrode portion 121 is not restricted to tungsten, and another plasma-resistant metal material may be used. For the material of the electrode portion 121, although there is deterioration in durability, copper, aluminum, iron, or an alloy thereof may be used, for example. Yttrium oxide added with a conductive material may be thermally sprayed in a portion of the surface of the electrode portion 121. Yttrium oxide added with a conductive material has electric resistivity of 1 to 30 Ωm, for example. The electrode life span is prolonged by thermally spraying this yttrium oxide. The diameter of the support portion 122 is not restricted to 3 mm, and it is sufficient as long as that dimension is greater than the diameter of the electrode portion 121. The material of the support portion 122 is a metal material that is easy to process, and may be copper, zinc, aluminum, tin, or brass or the like, which are materials that are used for typical screws. The first electrode 103a is able to be formed by pressing the electrode portion 121 into the support portion 122 to thereby form a single unit, for example. In this way, since a highly plasma-resistant metal material is used for the electrode portion 121, and an easily processable metal material is used for the support portion 122, it is possible to realize a first electrode 103a having stable characteristics that has low manufacturing costs while also being plasma resistant.

The support portion 122 may have the through hole 123 that passes through to the gas supply device (not depicted). The through hole 123 is connected to the space 124, and the gas 129 from the gas supply device is supplied to the space 124 via the through hole 123. The electrode portion 121 is then covered by the gas 129 supplied from the through hole 123. When electrode portion 121 has a single through hole 123, the through hole 123 is located at the lower side of the electrode portion 121 in the gravity direction as depicted in FIG. 5, thereby causing the electrode portion 121 to be covered by the gas 129 easily. When electrode portion 121 has a single through hole 123 two or more through holes 123, it is possible to suppress pressure loss in the through holes 123. The diameter of the through hole 123 is 0.3 mm, for example.

A screw 126 may be provided at the outer periphery of the support portion 122. For example, if the screw 126 at the outer periphery of the support portion 122 is a male screw, the holding block 120 may have a screw 127 that is a female screw. Thus, the screws 126 and 127 can be screwed together, and thereby the first electrode 103a can be fixed to the holding block 120. By rotating the support portion 122, it is possible to accurately adjust the position of the end surface of the electrode portion 121 related to the opening 125 of the insulator 128. The first electrode 103a may be connected to the power source 105 with the screw 126. Thus, the contact resistance of the power source 105 and the first electrode 103a can stabilize, and thus the characteristics of the first electrode 103a can stabilize. When the gas supply device (not depicted) and the first electrode 103a are connected and fixed with the screw 126, the connection therebetween can be implemented in a reliable manner. This kind of arrangement is related to waterproofing measures and safety measures when put into practical use.

The method for holding the electrode portion 121 is not limited to the aforementioned. It is sufficient as long as the gas bubble can be formed in liquid from the opening 125 of the insulator 128 by supplying the gas 129 to the space 124.

The insulator 128, which has an internal diameter of 1 mm, for example, is arranged around the periphery of the electrode portion 121 with the space 124 between the electrode portion 121 and the insulator 128. In the space 124, the gas 129 is supplied from the gas supply device, and thereby the electrode portion 121 is covered by the gas 129. Therefore, the outer periphery of the electrode portion 121 does not come into direct contact with liquid even though the metal of the electrode is exposed. The opening 125 is provided in the insulator 128, and has the function of determining the size of the gas bubble 109 when the gas bubble 109 is generated in the liquid inside the treatment tank 101. The insulator 128 may be formed from a material such as aluminum oxide, magnesium oxide, yttrium oxide, insulative plastic, glass, or quartz.

The opening 125 of the insulator 128 may be arranged in the liquid inside the treatment tank 101. In other words, although the opening 125 is provided at the end surface of the insulator 128 as depicted in FIG. 2, the opening 125 may be provided at the side surface of the insulator 128. A plurality of openings 125 may be provided in the insulator 128. The diameter of the opening 125 is 1 mm, as an example.

The second electrode 104 may be made of conductive metal materials; for example, copper, aluminum, or iron or the like, but is not limited to this.

A pump may be used as the gas supply device, for example. Air, He, Ar, or $O_2$ or the like is used for the gas 129 that is supplied, for example. The flow rate may be selected from the range of 0.5 L/min. to 2.0 L/min., for example, but is not limited to this.

The power source 105 applies a pulse voltage or an AC voltage between the first electrode 103a and the second electrode 104.

(Production of Radicals)

The production of radicals by the plasma generator 102 according to the modified example depicted in FIG. 5 will now be described.

The gas supply device (not depicted) supplies the gas 129 to the space between the first electrode 103a and the insulator 128 in a state where liquid is present inside the treatment tank 101. The gas 129 is emitted into the liquid inside the treatment tank 101 via the opening 125 of the insulator 128. At such time, a columnar gas bubble that covers the electrode portion 121 of the first electrode 103a is formed in the liquid. The gas bubble is a single large gas bubble extending from the opening 125 of the insulator 128 for a specific distance (10 mm or more, for example). In other words, since the gas 129 flows into the space 124 between the electrode portion 121 of the first electrode 103a and the insulator 128, the electrode portion 121 of the first electrode 103a is ordinarily covered by the gas 129. At such time, the surface of the electrode portion 121 of the first electrode 103a does not come into direct contact with the liquid.

Note that in the present disclosure, "the surface of the first electrode does not come into direct contact with the liquid" refers to the surface of the first electrode not coming into contact with a large mass of liquid inside the treatment tank. Therefore, for example, the state where "the surface of the first electrode does not come into direct contact with the liquid" includes the state where the surface of the first electrode is wet with liquid (strictly speaking, the surface of the first electrode is in contact with the liquid) and covered by the gas inside the gas bubble. It is possible for this kind of state to occur, for example, when a gas bubble is generated while the surface of the first electrode is wet with liquid.

As mentioned above, after the surface of the electrode portion 121, or exposed conductor portion, of the first electrode 103a has been covered by a gas bubble, the power source 105 applies a high-frequency AC voltage or a pulse voltage between the first electrode 103a and the second electrode 104. This causes an electrical discharge inside the gas bubble in the vicinity of the first electrode 103a, and thereby plasma is generated. The voltage value or the current value output by the power source 105 may be a value of a range with which glow discharge is generated. Although the plasma spreads to the entirety of the gas bubble, highly concentrated plasma is formed particularly in the vicinity of the first electrode 103a. Radicals and so forth that sterilize the liquid and/or decompose chemical substances included in the liquid are produced by the plasma. There are no particular limitations regarding the distance between the first electrode 103a and the second electrode 104.

According to the modified example of the plasma generator 102 depicted in FIG. 5, radicals having a long residence time can be produced. To be specific, it has been confirmed that it is possible to produce OH radicals having a life span of approximately 10 min. from the generation of plasma being stopped. The life span of the OH radicals is the half-life of the OH radical quantity calculated by measuring the OH radical quantity at each predetermined time using the electron spin resonance (ESR) method after the plasma has stopped.

(Liquid Treatment Method)

An example of a liquid treatment method in which the liquid treatment unit 100 according to embodiment 1 is used will now be described.

(1) First, the inside of the treatment tank 101 is filled with liquid (first step).

(2) Next, the plasma generator 102 generates plasma inside the treatment tank 101 for a predetermined time while liquid is retained inside the treatment tank 101, thus causing the retained liquid to be treated (second step). Here, "liquid being retained inside the treatment tank 101" refers to, for example, the state where the supply of liquid into the treatment tank 101 and/or the ejection of liquid from the treatment tank 101 has been stopped. This treatment is referred to as prior plasma treatment. As a result of this prior plasma treatment, the liquid retained in the treatment tank 101 can be treated. Radicals having a long residence time are present in the treated liquid.

(3) Next, at the same time that a portion of the liquid retained in the treatment tank 101 is ejected from the treatment tank 101 via the outlet 108, new liquid is supplied into the treatment tank 101 via the inlet 107, thus causing liquid inside the treatment tank 101 to be treated (third step).

A portion of the liquid to be treated may be supplied into the treatment tank 101 in the first step, and the remaining liquid to be treated may be supplied into the treatment tank 101 in the third step. In this case, prior to performing the third step, the prior plasma treatment is performed in advance for a portion of the liquid to be treated.

In the liquid treatment unit 100 according to embodiment 1 of the present disclosure, since radicals having a long residence time are produced in at least a portion of the treatment tank 101 by the plasma generator 102, the radicals and bacteria can be brought into contact with each other for a long period of time while the liquid is retained, thus causing the liquid to be sterilized in an efficient manner. New liquid is supplied at the same time that a portion of the liquid retained in the treatment tank 101 is ejected. Many radicals remain in the treated liquid that is retained in the treatment tank 101. Therefore, when new liquid is supplied into the treatment tank 101, the newly supplied liquid can be treated by the radicals having a long residence time included in the treated liquid retained in the treatment tank 101.

The plasma may be generated inside the treatment tank 101 by the plasma generator 102 in the third step in addition to the second step. Thus, in the third step, when new liquid is supplied into the treatment tank 101, the newly supplied liquid can be treated by not only the radicals remaining in the treated liquid retained in the treatment tank 101 but also by the radicals that are newly produced by the plasma generator 102.

The plasma generator 102 that is able to produce radicals having a long residence time is not limited to the configuration indicated in embodiment 1 of the present disclosure. The inventors have confirmed that it is possible to produce radicals having a long residence time also in plasma generators having the configurations described in embodiment 2 and embodiment 3 described hereafter. A plasma generator having another configuration may be effectively applied in the liquid treatment unit of the present disclosure as long as radicals having a long residence time can be produced.

(Working Example 1)

Working example 1 is an example in which the liquid treatment according to the first step to the third step described above is executed using a liquid treatment unit provided with: the treatment tank 101 having a shape with which a portion of liquid can be retained; and the plasma generator 102 having the first electrode 103a and the configuration peripheral thereto depicted in FIG. 5.

The liquid treatment unit 100a of working example 1 was as depicted in FIG. 2. To be specific, the treatment tank 101 had a volume of 70 mL.

The plasma generator 102 was as depicted in FIG. 5. To be specific, the electrode portion 121 was made of tungsten, and the diameter thereof was 0.95 mm. The support portion 122 was made of iron, and the diameter thereof was 3 mm. The through hole 123 of the support portion 122 had a diameter of 0.3 mm. The insulator 128 was formed from alumina ceramic, and had an internal diameter of 1 mm. The opening 125 provided in the insulator 128 had a diameter of 1 mm. The interval between the electrode portion 121 and the insulator 128 was 0.05 mm. The distance between the first electrode 103 and the second electrode 104 was 10 mm. The second electrode 104 was made of tungsten, and the diameter was 1 mm. The gas supply quantity supplied from the through hole 123 was 1 L/min. The power source 105 that applies a voltage between the first electrode 103 and the second electrode 104 was capable of applying a pulse voltage. The output capacity thereof was 80 VA, and for the peak voltage at no load, a voltage of 10 kV was able to be applied.

The procedure for the liquid treatment method in working example 1 is as follows.

(1) A portion of *Staphylococcus aureus* solution to be treated was supplied into the treatment tank 101 (first step). The bacteria quantity in the *Staphylococcus aureus* solution was approximately 1×104 cfu/mL. The volume of the treatment tank 101 to which the *Staphylococcus aureus* solution was supplied was approximately 70 mL.

(2) Next, the plasma generator 102 generated plasma inside the treatment tank 101 for a predetermined time while liquid was retained inside the treatment tank 101, and thereby the retained liquid was treated (second step). This treatment is performed in advance for a portion of the liquid to be treated, and is therefore referred to as prior plasma treatment. As a result of this prior plasma treatment, the liquid retained in the treatment tank 101 was treated and sterilized, and radicals remained in the liquid.

(3) Next, while plasma was generated inside the treatment tank 101 by the plasma generator 102, a portion of the liquid inside the treatment tank 101 was ejected from the treatment tank 101 via the outlet 108, and also the remaining *Staphylococcus aureus* solution was supplied into the treatment tank 101 via the inlet 107, and thus liquid was then treated (third step). The *Staphylococcus aureus* solution was supplied into the treatment tank 101 at a flow velocity of 0.5 L/min. The flow velocity of the liquid ejected from the treatment tank 101 was 0.5 L/min, and the quantity of the liquid was 250 mL. The liquid was treated for 20 seconds. At such time, treated liquid was retained in the treatment tank 101 due to the shape thereof. Therefore, the newly supplied liquid was mixed with the liquid retained inside the treatment tank 101. In this way, new liquid was supplied, and also a portion of the treated liquid retained in the treatment tank 101 was mixed. Thus, the newly supplied liquid was treated by using the residual radicals included in the treated liquid retained in the treatment tank 101, and the radicals that are sequentially generated by the plasma generator 102.

Figure 6:
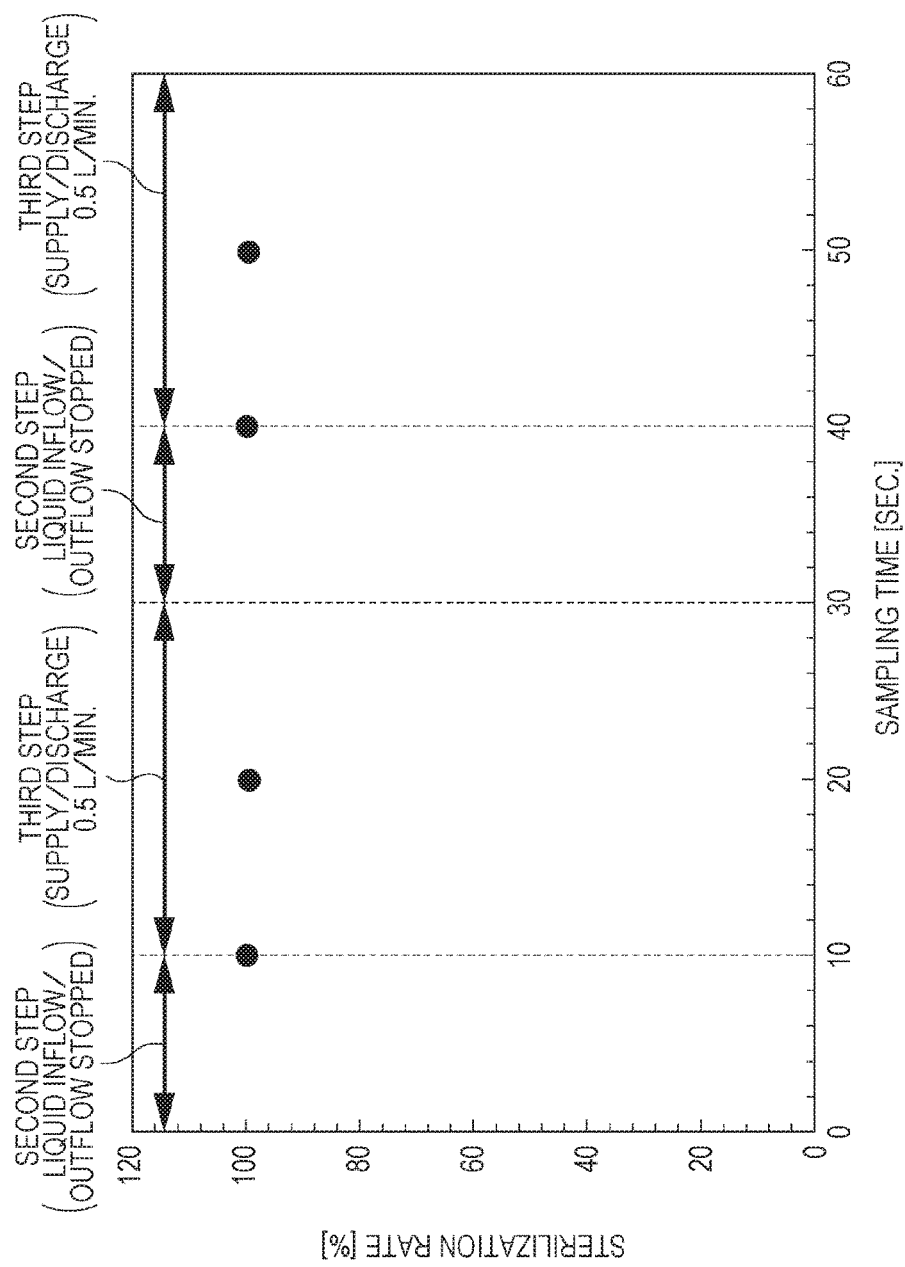
FIG. 6 is a drawing depicting the relationship between the sampling time and the sterilization rate in the liquid treatment unit according to working example 1 of the present disclosure.

FIG. 6 is a graph depicting the relationship between the sterilization rate of *Staphylococcus aureus* in liquid obtained from the outlet 108 and time. The horizontal axis in FIG. 6 indicates elapsed time in which 0 seconds is immediately after the second step has been started from the outlet 108. The vertical axis in FIG. 6 indicates the sterilization rate. The period from 0 to 10 seconds is a period in which plasma treatment is performed in a state where liquid is retained in the treatment tank 101 after both the supply of liquid and the ejection of liquid are stopped, or in other words, a second step period. The period from 10 seconds to 30 seconds is a period in which a portion of the liquid is ejected while new liquid is supplied into the treatment tank 101 for liquid to be treated, or in other words, a third step period. The period from 30 seconds to 40 seconds indicates a second step period. The period from 40 seconds to 60 seconds indicates a third step period. As a result, as depicted in FIG. 6, solution having a sterilization rate of 99% or more was continuously obtained.

In the period from 10 seconds to 30 seconds in which the third step is executed, liquid of approximately 75 mL was ejected in the first 9 seconds. That is, liquid of a quantity corresponding to the total quantity of liquid treated by the prior plasma treatment in the second step has already been ejected in the 10-second to 20-second stage of the third step. Therefore, the sterilization rate is expected to decline thereafter because liquid in which newly supplied liquid has been mixed is invariably ejected. However, actually, a sterilization rate of approximately 99% or more was obtained even after 20 seconds. As mentioned above, this is thought to be probably because the liquid retained in the treatment tank 101 and the newly supplied liquid were mixed with each other due to the treatment tank 101 having a shape which allowed a portion of the liquid to be retained. In other words, the newly supplied liquid was treated by using the radicals included in the treated liquid retained in the treatment tank 101, and the radicals sequentially generated by the plasma generator 102. Thus, it is thought that it is possible to obtain a sterilization rate of 99% or more.

(Reference Example)

The reference example differs with working example 1 in that the liquid treatment unit includes a flow passage tube that does not have a shape with which a portion of the liquid can be retained, instead of the treatment tank that has a shape which allows a portion of the liquid to be retained. To be specific, the flow passage tube of the reference example is able to retain all of the liquid therein and to pass all of the liquid therethrough, but is not able to pass a portion of the liquid while retaining the remaining liquid. The capacity of the entirety of the flow passage tube is 250 mL.

The specific liquid treatment procedure in the reference example is as follows.

(1) First, a portion of the *Staphylococcus aureus* solution or the *E. coli* solution to be treated flows into the flow passage tube. In the case of the *Staphylococcus aureus* solution, the bacteria quantity was approximately 1×104 cfu/mL. In the case of the *E. coli* solution, the bacteria quantity was approximately 1×104 cfu/mL. The volume of the flow passage tube was approximately 250 mL.

(2) Liquid was retained inside the flow passage tube and prior plasma treatment was performed for a predetermined time. In the case of the *Staphylococcus aureus* solution, prior plasma treatment was performed for 10 min. or 15 min. In the case of the *E. coli* solution, prior plasma treatment was performed for 20 min. or 30 min.

(3) Next, while plasma was generated, together with liquid being ejected from the flow passage tube, the *Staphylococcus aureus* solution or the *E. coli* solution was supplied to the flow passage tube for the liquid to be treated. In the case of the *Staphylococcus aureus* solution and in the case of the *E. coli* solution, the solution was supplied to the flow passage tube at a flow velocity of 0.5 L/min. In the case of the *Staphylococcus aureus* solution and in the case of the *E. coli* solution, the flow rate of the liquid ejected from the flow passage tube was 0.5 L/min. At such time, the total quantity of the liquid was ejected from the flow passage tube without being retained inside the flow passage tube. Other conditions such as the power source and the configuration of the plasma generator were the same as in working example 1.

Figure 7:
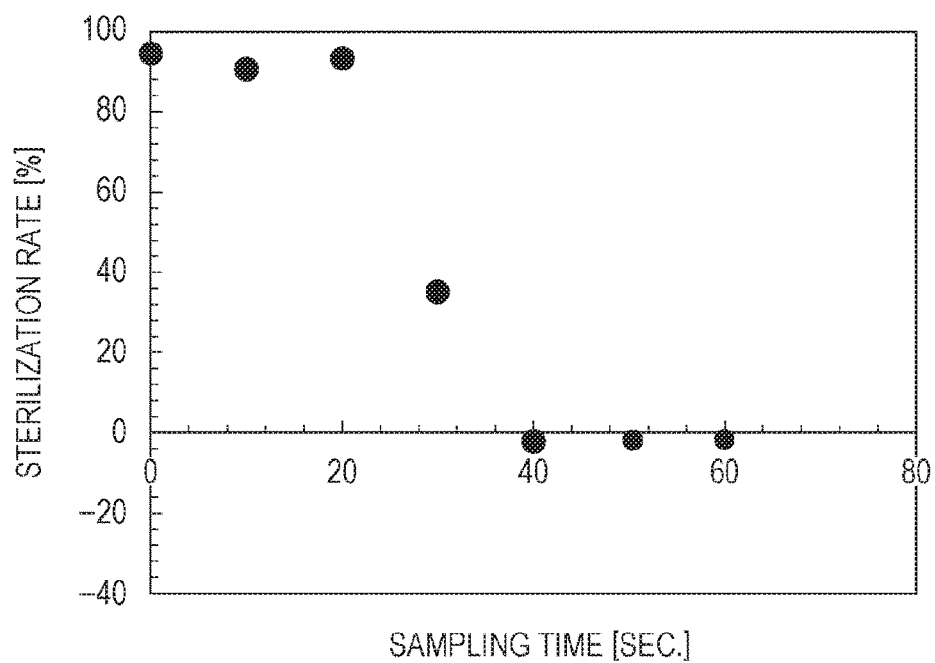
FIG. 7 is a graph depicting, in a reference example, the relationship between the sampling time and the sterilization rate when *Staphylococcus aureus* solution is used as the liquid to be treated.
Figure 8:
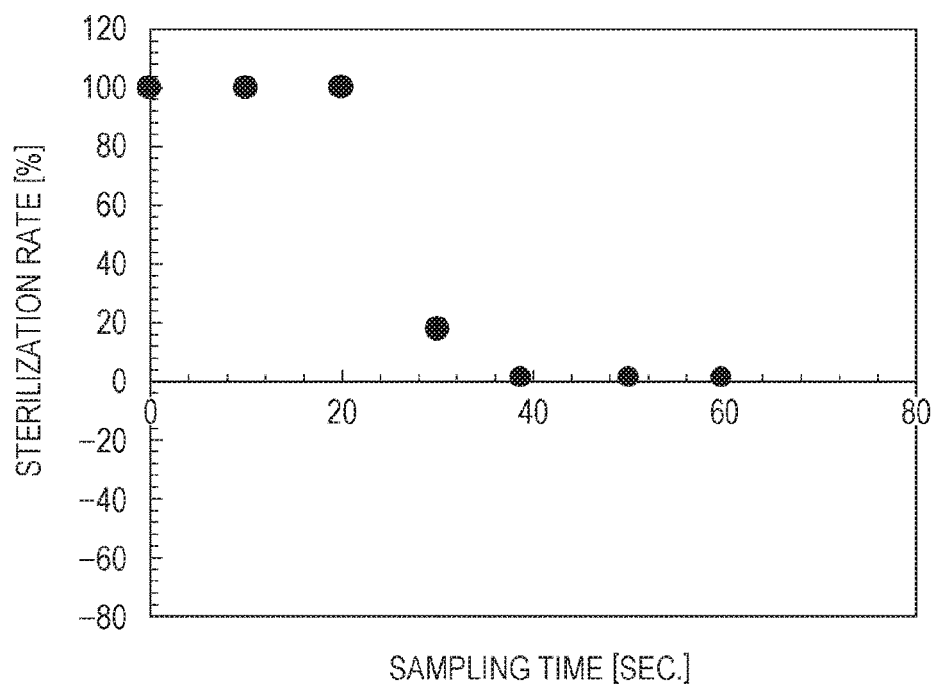
FIG. 8 is a graph depicting, in a reference example, the relationship between the sampling time and the sterilization rate when *E. coli* solution is used as the liquid to be treated.

FIG. 7 is a graph depicting the relationship between the sterilization rate obtained from the flow passage tube and time when *Staphylococcus aureus* solution was used as the liquid to be treated. FIG. 8 is a graph depicting the relationship between the sterilization rate obtained from the flow passage tube and time when *E. coli* solution was used as the liquid to be treated. The horizontal axes in FIG. 7 and FIG. 8 indicate elapsed time in which 0 seconds is immediately after the ejection from the flow passage tube has been started in the step of the aforementioned (3). The vertical axes in FIG. 7 and FIG. 8 indicate the sterilization rate. As depicted in FIG. 7 and FIG. 8, liquid for which prior plasma treatment has been performed was ejected from 0 to 30 seconds, and solution having a sterilization rate of 99% or more was continuously obtained in each case. However, after 30 seconds, newly supplied *Staphylococcus aureus* solution or *E. coli* solution was ejected, and the sterilization rate deteriorated.

The flow passage tube used in the liquid treatment unit did not have a shape which allows a portion of the liquid to be retained, and therefore liquid that had been subjected to prior plasma treatment was sequentially ejected from inside the flow passage tube via the outlet 108. In this case, it is thought that the treated liquid and the newly supplied liquid hardly mix because the flow passage tube is not able to retain a portion of the liquid. As a result, it is thought that, after 30 seconds during which the total quantity of the liquid treated by the prior plasma treatment has been ejected, it is no longer possible for bacteria in the newly supplied liquid to be sufficiently killed with only the radicals produced by the plasma generator 102.

Embodiment 2

In contrast with the liquid treatment unit according to embodiment 1, the liquid treatment unit according to embodiment 2 is different with respect to the first electrode and the configuration peripheral thereto in the plasma generator.

Figure 9:
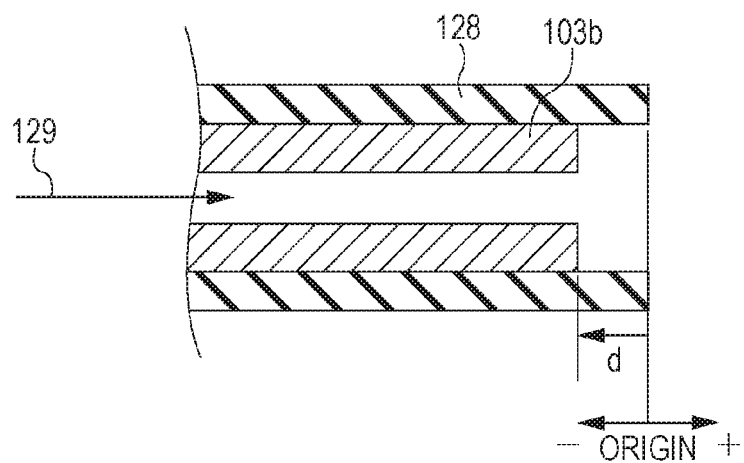
FIG. 9 is a schematic diagram depicting an example of the top end of a first electrode and the configuration peripheral thereto in a plasma generator in a liquid treatment unit according to embodiment 2 of the present disclosure.

FIG. 9 is an enlarged view depicting an example of a first electrode 103b and the configuration peripheral thereto, that are part of a plasma generator in the liquid treatment unit according to embodiment 2. The first electrode 103b is formed from metal, for example. The first electrode 103b has a shape with openings at both ends thereof, or hollow cylindrical shape, for example. A tubular insulator 128 is arranged adhered to the outer peripheral surface of the first electrode 103b. The insulator 128 is cylindrical, for example. The insulator 128 is formed from alumina ceramic, for example. The insulator 128 may be configured from titanium oxide, for example.

A gas supply device is connected to the opening at one end of the first electrode 103b. Gas 129 supplied from the gas supply device passes through an internal space in the first electrode 103b, and is emitted into liquid as a gas bubble, from the opening at the other end of the first electrode 103b. The insulator 128 may be configured to be slidable with respect to the first electrode 103b.

With the aforementioned configuration, when gas is continuously supplied to the opening at one end of the first electrode 103b, a gas bubble is formed in the liquid, from the opening at the other end of the first electrode 103b. The gas bubble is a columnar gas bubble having dimensions such that the gas therein covers the opening at the other end of the first electrode 103b, or in other words, the opening at the other end of the first electrode 103b is positioned inside the gas bubble. The end surface of the first electrode 103b, which is located in the vicinity of the opening at the other end thereof, is not covered by the insulator 128, and thus a conductor of the end surface is exposed. Therefore, by using the gas supply device to appropriately set the gas supply quantity, a state is maintained in which the vicinity of the opening at the other end of the first electrode 103b is covered by gas inside a gas bubble. In other words, the gas supply device can supply the gas 129 to the first electrode 103b so that at least the exposed conductor surface of the first electrode 103b is positioned inside the gas bubble in the treatment tank 101. The insulator 128 formed from alumina ceramic is arranged at the outer peripheral surface of the first electrode 103b. Therefore, the surface of the first electrode 103b is configured in such a way that, due to the insulator 128 and the gas bubble, it is possible to achieve a state where direct contact is not made with the liquid.

The power source 105 applies a voltage between the first electrode 103b and a second electrode 104 after a state is reached where the exposed portion of the conductor of the first electrode 103b is positioned inside the gas bubble. The operation thereafter is the same as in embodiment 1.

Embodiment 3

In contrast with the liquid treatment unit according to embodiment 1, the liquid treatment unit according to embodiment 3 is different with respect to the first electrode and the configuration peripheral thereto in the plasma generator. The liquid treatment unit according to embodiment 3 does not have a gas supply device.

Figure 10:
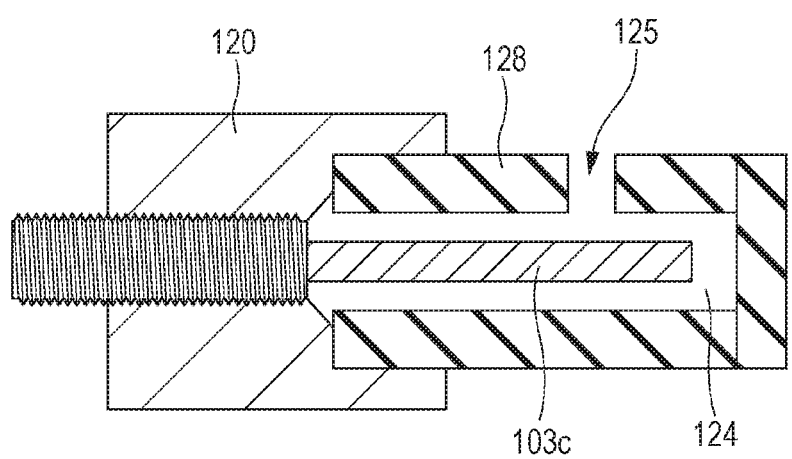
FIG. 10 is a schematic diagram depicting an example of a first electrode and the configuration peripheral thereto in a plasma generator in a liquid treatment unit according to embodiment 3 of the present disclosure.

FIG. 10 is a cross sectional view depicting an example of a first electrode 103c and the configuration peripheral thereto that form part of a plasma generator in the liquid treatment unit according to embodiment 3. As depicted in FIG. 10, an insulator 128 surrounds the outer periphery of the first electrode 103c with a space 124 therebetween. The insulator 128 has at least one opening 125 through which the space 124 communicates the inside of the treatment tank 101. This configuration allows liquid inside the treatment tank 101 to enter into the space 124 through the opening 125, and thus the space 124 is filled with the liquid. One end of the first electrode 103c and one end of the insulator 128 are fixed to a holding block 120. The method for fixing the first electrode 103c and the insulator 128 is not limited to this. A second electrode 104 may be arranged in any position in the treatment tank 101, and there are no restrictions regarding the arrangement position.

The operation of a plasma generator including the first electrode 103c is as follows.

Prior to starting the liquid treatment, the space 124 between the first electrode 103c and the insulator 128 is filled with liquid. In this state, a power source 105 applies a high-frequency AC voltage or a pulse voltage between the first electrode 103c and the second electrode 104, thereby heating the liquid inside the space 124.

The temperature of the liquid inside the space 124 rises due to the electrical power provided from the first electrode 103c. This rise in temperature causes the liquid inside the space 124 to vaporize, and thus gas is generated. The gas forms a mass while gathering inside the space 124. Plasma is then generated due to electrical discharge occurring inside the mass of gas, or in other words, inside a gas bubble. Active species such as radicals are produced by the plasma. This enables the liquid to be sterilized and/or enables chemical substances in the liquid to be decomposed by such gas bubbles.

In the liquid treatment units 100 and 100a according to embodiments 1 to 3, radicals having a long residence time can be produced in liquid inside the treatment tank 101 by the plasma generator 102, and then the liquid including the radicals can be retained inside the treatment tank 101. Thus, the radicals can be brought into contact with bacteria in the liquid for a long period of time, and thereby the liquid can be treated. Since a portion of the treated liquid is retained in the treatment tank 101 while the liquid is ejected, newly supplied liquid can be effectively treated with the residual radicals included in the liquid retained in the treatment tank 101.

In the liquid treatment units 100 and 100a according to embodiments 1 to 3, the plasma generator 102 is arranged inside the treatment tank 101. The plasma generator 102 has a configuration with which a voltage is applied between the first electrode 103 and the second electrode 104. With this configuration, the power source 105 applies a voltage between the first electrode 103 and the second electrode 104, thereby generating plasma in the liquid inside the treatment tank 101 to produce radicals having a long residence time. Thus, bacteria present in the liquid retained inside the treatment tank 101 can be treated.

In embodiments 1 to 3, descriptions have been given with regard to examples in which bacteria present in the liquid inside the treatment tank 101 are killed and/or organic matters present in the liquid inside the treatment tank 101 is decomposed, and is not limited to this. In the liquid treatment unit of the present disclosure, the liquid inside the treatment tank 101 may not include bacteria and/or organic matters. In other words, it is sufficient as long as the liquid treatment unit of the present disclosure has a configuration with which it is possible to produce products such as radicals that are able to kill bacteria in liquid and/or are able to decompose organic matters, and, in practice, bacteria do not have to be eliminated in the liquid treatment unit and organic matter does not have to be decomposed. Therefore, "treat liquid" in the present disclosure may refer only to radicals being produced in liquid, and whether bacteria in liquid are killed and/or organic matters in liquid are decomposed may be inconsequential. For example, the liquid treatment unit of the present disclosure includes a mode in which liquid not including bacteria or organic matters are supplied into a treatment tank, and liquid including radicals is ejected from the treatment tank. The "treatment efficiency of liquid" in the present disclosure may be the efficiency at which liquid that includes radicals is obtained.

With the liquid treatment unit of the present disclosure, by combining with another device, it is possible to perform sterilization in the other device using treated liquid ejected from the treatment tank.

In the liquid treatment unit of the present disclosure, a portion of liquid is ejected from the liquid inside the treatment tank, and the remaining liquid is retained inside the treatment tank. Thus, in the liquid treatment unit of the present disclosure, radicals having a long life span can be continuously maintained in the liquid retained inside the treatment tank and in the liquid ejected from the treatment tank, even when liquid is newly supplied. This is clear also from the experiment results depicted in FIG. 6 to FIG. 8.

In embodiments 1 to 3, the first electrode 103 and the configuration peripheral thereto are exemplified. Therefore, the liquid treatment unit of the present disclosure is not limited to the first electrode and the configuration peripheral thereto indicated in embodiments 1 to 3, and various configurations can be used. It is sufficient as long as the plasma generator 102 has a configuration to produce products such as radicals that can decompose bacteria in the liquid retained in the treatment tank 101.

(Other Application Examples)

The liquid treatment unit of the present disclosure may be incorporated into a toilet seat with a washer. The toilet seat with a washer includes a washing nozzle. Liquid ejected from the treatment tank of the liquid treatment unit is supplied to the washing nozzle. The toilet seat with a washer may include an input part to receive input that instructs washing from a user. In this case, the controller may execute the second step prior to the input from the input part, and execute the third step and ejection the liquid inside the treatment tank to the washing nozzle on the basis of the input from the input part. The toilet seat with a washer may include a sensor that detects the approach of a user. In this case, the controller may execute the second step on the basis of the sensor detection, and then execute the third step and eject the liquid inside the treatment tank to the washing nozzle on the basis of the input from the input part.

The liquid treatment unit of the present disclosure may be incorporated into a washing machine. The washing machine includes a washing tub. Liquid ejected from the treatment tank of the liquid treatment unit is supplied to the washing tub. For example, the washing machine may include an input part to receive input that instructs the start of washing from a user. In this case, the controller may, based on the input from the input part, execute the first step, the second step and the third step, and thereby ejecting the liquid inside the treatment tank to the washing tub. For example, the controller may, based on the input from the input part, execute the second step and, at the timing at which detergent adhered to the clothing in the washing tub is rinsed out, execute the third step and eject the liquid inside the treatment tank to the washing tub.

The liquid treatment unit of the present disclosure may be incorporated into a liquid treatment apparatus. The liquid treatment apparatus includes a water inlet that is connected to the ejection portion of the liquid treatment unit. The liquid treatment apparatus is, for example, a water purifying apparatus, an air conditioner, a humidifier, an electric shaver washer, a dish washer, a processing apparatus for hydroponic culture, an apparatus for circulating nourishing solution, a toilet seat with a washer, a water purifier, a washing machine, an electric kettle, or an air cleaner or the like.

Modes in which various modifications conceived by those skilled in the art have been implemented in the present embodiments or modified examples thereof, and modes constructed by combining constituent elements in different embodiments or modified examples thereof are also included in the scope of the present disclosure provided they do not depart from the purpose of the present disclosure. These comprehensive or specific aspects may be realized by a method.

For example, a liquid treatment method may include: a step in which supply of liquid to a treatment tank and ejection of liquid from the treatment tank are stopped for a predetermined time in a state where liquid is present inside the treatment tank; a step in which plasma is generated in the liquid in the treatment tank; and a step in which, after the step in which stopping is performed, liquid is ejected from the treatment tank while liquid is supplied into the treatment tank. The step in which stopping is performed and the step in which the plasma is generated may be performed at the same time. Note that in the present disclosure, a plurality of steps being "performed at the same time" only refers to there being a period in which the plurality of steps are executed at the same time, and whether the start times and the end times of the plurality of steps coincide may be inconsequential. In the present disclosure, "B is performed while A is performed" only refers to there being a period in which A and B are executed at the same time, and whether the start times and the end times of A and B coincide may be inconsequential.

For example, the liquid treatment method may additionally include a step in which liquid is supplied into the treatment tank, prior to the step in which stopping is performed.

For example, the step in which ejection is performed while supply is performed, and the step in which the plasma is generated may be performed at the same time.

For example, in the step in which ejection is performed while supply is performed, liquid having a volume that is equal to or greater than that of the treatment tank may be ejected.

For example, the liquid treatment method may additionally include a step in which a portion of the liquid in the treatment tank is recirculated to the treatment tank, and the remaining liquid is ejected from the treatment tank.

For example, the liquid treatment method may additionally include a step in which gas included in circulated liquid is separated.

For example, the step in which the plasma is generated may additionally include a step in which a voltage is applied between a first electrode and a second electrode at least portions of which are arranged inside the treatment tank.

For example, the step in which the plasma is generated may additionally include a step in which gas is supplied into a space formed between the first electrode and an insulator arranged around the periphery of the first electrode, and the step in which a voltage is applied may be executed in a state where an exposed portion of a conductor, which is positioned inside the treatment tank, of the first electrode is covered by the gas supplied in the step in which gas is supplied.

For example, the step in which the plasma is generated may additionally include a step in which, by applying a voltage between the first electrode and the second electrode, liquid inside the space formed between the first electrode and the insulator arranged around the periphery of the first electrode is vaporized and gas is produced, and the step in which a voltage is applied may be executed in a state where the exposed portion of the conductor, which is positioned inside the treatment tank, of the first electrode is covered by the gas produced in the step in which gas is produced.

For example, the liquid treatment method may additionally include a step in which an instruction from the user is received, after the step in which stopping is performed, prior to the step in which ejection is performed while supply is performed.

For example, the liquid treatment method may additionally include a step in which an instruction from the user is received, prior to the step in which stopping is performed.

The liquid treatment unit according to the present disclosure is useful in applications for a water purifying apparatus, an air conditioner, a humidifier, an electric shaver washer, a dish washer, a processing apparatus for hydroponic culture, an apparatus for circulating nourishing solution, a toilet seat with a washer, a water purifier, a washing machine, an electric kettle, or an air cleaner or the like.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A method comprising:
   supplying a liquid into a treatment tank;
   generating plasma in the liquid inside the treatment tank to treat the liquid, while stopping supply of a new liquid into the treatment tank;
   while the treated liquid remains inside the treatment tank, starting supply of a new liquid into the treatment tank and ejection of the treated liquid from the treatment tank to mix the supplied new liquid with the treated liquid in the treatment tank;
   controlling at least one of a flow rate of the supply of the new liquid into the treatment tank and a flow rate of the ejection of the mixed liquid from the treatment tank to allow the mixed liquid to be partially retained inside the treatment tank;
   stopping the supply of the new liquid and the ejection of the mixed liquid, and
   repeating the generating step, the starting step, the controlling step, and the stopping step.

2. The method according to claim 1, wherein the plasma is generated in the liquid inside the treatment tank while the new liquid is supplied into the treatment tank.

3. The method according to claim 1, wherein:
   the supply of the new liquid and the ejection of the mixed liquid are continuously performed; and
   a total quantity of liquid ejected from the treatment tank is equal or greater than a volume of the treatment tank.

4. The method according to claim 1, further comprising:
   causing a part of the mixed liquid ejected from the treatment tank to recirculate as circulated liquid to the treatment tank through a circulation passage.

5. The method according to claim 4, wherein gas contained in the circulated liquid is separated from the circulated liquid in the recirculating.

6. The method according to claim 1, wherein the generating of the plasma includes applying a voltage between a first electrode and a second electrode, each of which is at least partially disposed in the treatment tank.

7. The method according to claim 6, wherein:
   the generating of the plasma further includes, before the applying of the voltage, supplying gas into a space between the first electrode and an insulator that surrounds the first electrode in the treatment tank; and
   the applying of the voltage is performed when a portion of the first electrode is covered with the supplied gas.

8. The method according to claim 6, wherein the voltage causes the liquid to be partially vaporized to produce gas, and causes discharge when a portion of the first electrode is covered with the produced gas to generate the plasma.

9. The method according to claim 1, wherein the starting the supply of the new liquid and the ejection of the mixed liquid are performed in response to an instruction from a user.

10. The method according to claim 1, wherein the stopping of the supply and the ejection is performed in response to an instruction from a user.

* * * * *